(12) United States Patent
Pemble

(10) Patent No.: US 7,257,469 B1
(45) Date of Patent: Aug. 14, 2007

(54) DELIVERING DATA UPDATES TO AN AVIONICS DEVICE

(75) Inventor: Cliff A. Pemble, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 420 days.

(21) Appl. No.: 10/722,303

(22) Filed: Nov. 25, 2003

(51) Int. Cl.
*G06F 19/00* (2006.01)

(52) U.S. Cl. .................... 701/3; 701/200; 340/945

(58) Field of Classification Search ............. 701/3, 701/200, 208, 213; 340/945, 995.1, 995.12, 340/995.18
See application file for complete search history.

(56) References Cited

U.S. PATENT DOCUMENTS

| | | | |
|---|---|---|---|
| 4,642,775 A * | 2/1987 | Cline et al. | 701/200 |
| 5,597,335 A | 1/1997 | Woodland | 441/36 |
| 5,948,040 A | 9/1999 | DeLorme et al. | 701/201 |
| 6,275,231 B1 | 8/2001 | Obradovich | 345/349 |
| 6,381,538 B1 * | 4/2002 | Robinson et al. | 701/211 |
| 6,401,034 B1 | 6/2002 | Kaplan et al. | 701/209 |
| 6,438,468 B1 * | 8/2002 | Muxlow et al. | 701/3 |
| 6,545,631 B2 * | 4/2003 | Hudson et al. | 342/30 |
| 6,603,405 B2 * | 8/2003 | Smith | 340/905 |
| 6,650,972 B1 * | 11/2003 | Robinson et al. | 701/3 |
| 6,687,578 B2 | 2/2004 | Lehman et al. | 701/3 |
| 6,703,944 B1 | 3/2004 | Obradovich | 340/903 |
| 6,744,396 B2 * | 6/2004 | Stone et al. | 342/36 |
| 6,768,942 B1 | 7/2004 | Chojnacki | 701/200 |
| 6,828,922 B1 | 12/2004 | Gremmert et al. | 340/949 |
| 6,917,860 B1 * | 7/2005 | Robinson et al. | 701/3 |
| 6,973,479 B2 * | 12/2005 | Brady et al. | 709/203 |
| 6,975,923 B2 | 12/2005 | Spriggs | 700/245 |
| 6,978,208 B2 | 12/2005 | Endo et al. | 701/202 |
| 7,010,398 B2 * | 3/2006 | Wilkins et al. | 701/3 |
| 2002/0111720 A1 * | 8/2002 | Holst et al. | 701/3 |
| 2003/0003872 A1 * | 1/2003 | Brinkley et al. | 455/66 |
| 2003/0222887 A1 * | 12/2003 | Wilkins et al. | 345/618 |
| 2004/0106404 A1 * | 6/2004 | Gould et al. | 455/431 |

* cited by examiner

*Primary Examiner*—Gary Chin
(74) *Attorney, Agent, or Firm*—David L. Terrell

(57) ABSTRACT

Systems, devices, and methods are provided for updating information resident on an avionics device. One avionics device embodiment includes a processor, a memory, and a receiver. The memory can be in communication with the processor. The receiver can receive radio signals including update information. The device can update information resident on the device based upon the update information received.

42 Claims, 6 Drawing Sheets

DELIVERING DATA UPDATES TO AN AVIONICS DEVICE

FIELD OF THE INVENTION

Embodiments of the present invention relate generally to aviation systems and, more particularly to methods, systems, and devices for delivering updates to an avionics device or system.

BACKGROUND OF THE INVENTION

Electronic devices and systems are playing an ever increasing role in the field of avionics. For instance, the use of Global Positioning System (GPS) technology coupled with electronic navigational maps allows a pilot of an aircraft to chart the location and course of the aircraft.

Electronic devices can allow the pilot to navigate the aircraft by viewing the information displayed on a monitor, for example on a cockpit instrument panel, or the like. Cockpit instrument panels can include for example, a single device that is capable of providing the above functions, an integrated group of devices for providing the functions, or separate devices all providing functions independently.

Some devices can be utilized to indicate, the location of airports, waypoints, obstacles, and the like en route. Devices can also provide capabilities such as aircraft attitude, altitude, engine instrumentation, weather link data, and traffic and terrain data, among other functions. The devices that provide the functionality in the cockpit are increasingly utilizing software to provide various functions.

However, once installed in an aircraft, the application and operating system software that provides the functionality to the cockpit cannot typically be updated without a hardwired connection between the computer system of the aircraft and a server having the updates. Therefore, in order to update the software, the computer either has to be removed from the aircraft or a wired connection has to be made with the computer.

Some proposed systems are capable of being updated through use of a close proximity transfer mechanism such as Bluetooth, 802.11 (wi-fi), or Infrared technologies. However, these methods require the use of a device, having the updates thereon, that is in close proximity to the avionics computer on the aircraft. These devices typically are portable in order for the device to get close enough to make the connection to the computer on the aircraft. However, these systems are not suitable in all situations.

For example, when the size of the update is too large to be held on a portable device, the portable device would not be effective to execute updates. Additionally, in order to update the computer systems on a number of aircraft, the portable device would have to be brought into proximity to each aircraft. Such devices may not be readily available to all aircraft. For these and other reasons, this method of updating may not be accessible.

DETAILED DESCRIPTION OF THE INVENTION

Embodiments of the present invention provide devices, systems, and methods for delivering updates to an avionics device and/or system. In various embodiments, an avionics device can include a receiver for receiving radio signals from a remote transmitter. The radio signals can include update information for updating application and/or operating system software. Alternatively or additionally, the radio signals can include digital data for updating data used with the avionics device, such as terrain or map data or other navigation-related data such as airport and runway data.

For the purposes of describing the embodiments of the present invention, navigational data includes, for example, geographic terrain information, airport information, navaid information, and the like. The navigational data can provide the background context information upon which such things as maps and travel routes are illustrated.

As one of ordinary skill in the art will appreciate upon reading this disclosure, various embodiments of the invention can be performed in one or more devices, device types, and system environments including networked environments. The discussion which follows illustrates, by way of example and not by way of limitation, various network and system environments and devices that implement or include embodiments of the present invention. Additionally, in reading this disclosure and claims, it should be noted that the indefinite article "a" or "an" as it is used herein is not intended to limit the number of elements to one. Additionally, the term "a number of" should be interpreted as meaning one or more.

Figure 1:
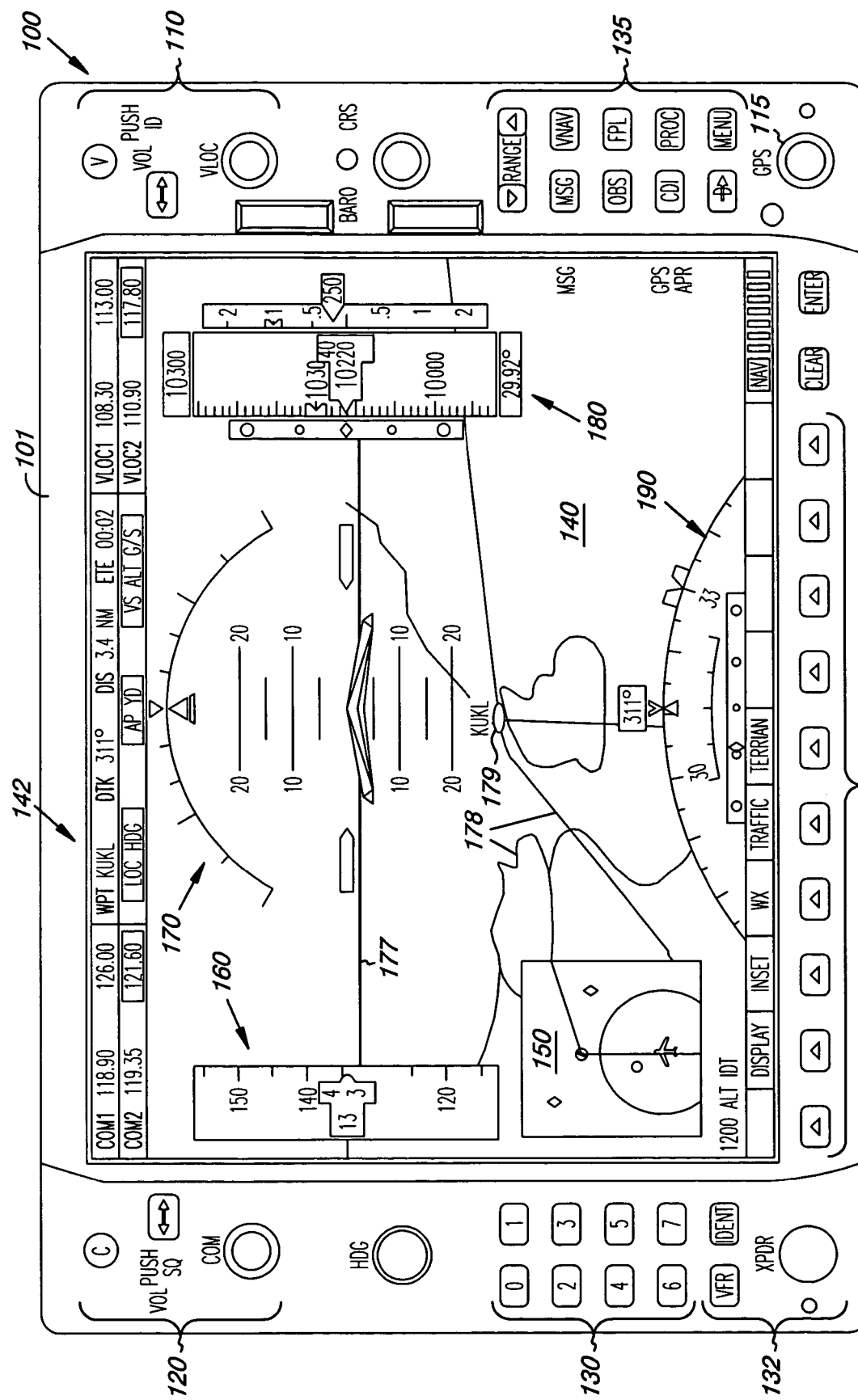
FIG. 1 illustrates an embodiment of an avionics device.

FIG. 1 illustrates a device embodiment of the present invention. The device 100 can be a multifunction display (MFD) device 100 and can provide a variety of functions. The device 100, as shown in FIG. 1, can be incorporated within a cockpit instrument panel. The device 100 can include a frame (or bezel) 101 that surrounds a display 140.

As shown in the embodiment of FIG. 1, the device 100 can include a number of aircraft instrument and/or input controls. As one of ordinary skill in the art will understand upon reading this disclosure, flight information data and other information associated with these aircraft instrument and/or input controls can be provided on display 140.

In the embodiment of FIG. 1, the device 100 is employed as a Primary Flight Display (PFD) device 100. As shown in FIG. 1, the frame 101 can have navigational input controls 110, such as for permitting control over a receiver. In FIG. 1, the frame 101 has communication input controls 120, for example, for permitting radio communications with air traffic controllers and/or other pilots.

Further in the embodiment of FIG. 1, the frame 101 has additional input controls including; transponder input controls such as numeric touch pad 130 and additional controls 132. As will be understood by one of ordinary skill in the art upon reading this disclosure, the numeric touch pad 130 and additional controls 132 are one embodiment of controls which can be included on frame 101. However, the embodiments of the invention are not so limited. By way of example, and not by way of limitation, additional input controls such as GPS controls 115 and autopilot controls 135 can be included on the embodiment shown in FIG. 1.

Additionally, overlay controls 114 can be located on the frame 101, to permit the pilot to adjust the main display 140 by overlaying graphical data related to weather, traffic, and terrain. Further in some embodiments, the display 140 can be customized by assigning functions to keys such as keys 114 of FIG. 1. All of the above described controls can be adapted to or be operable to manipulate the presentation of flight information data on display 140.

In the embodiment of FIG. 1, flight information data and/or a control setting is displayed horizontally as a data strip 142 across a top portion of the display 140. Further, within data strip 142, additional flight information data such as a flight plan waypoint (WPT KUKL), desired track (DTK), distance (DIS) to a flight plan waypoint, estimated time en route (ETE), and a number of other enunciators (LOC HDG, AP YD, and VS ALT G/S) can be provided.

In the embodiment of FIG. 1, the display 140 of the device 100 can further include one or more inset displays, such as display inset 150, as well as a number of graphical information overlays, 160, 170, 180, and 190. The display inset 150 and graphical information overlays, 160, 170, 180, and 190, can provide additional flight information data on display 140. As shown in the embodiment of FIG. 1, graphical information overlays, 160, 170, 180, and 190, can include indicators for airspeed 160, attitude 170, altitude 180, and heading 190. In the embodiment shown in FIG. 1, inset 150 illustrates a top down navigational view. Attitude indicator 170 provides, for example, functions such as pitch, roll, bank, and skid.

As shown in the embodiment of FIG. 1, the navigation related, flight information data illustrates a number of geographical features such as a horizon line 177, reservoirs and roadways 178, and a flight plan waypoint (KUKL) 179. The embodiment shown in FIG. 1 provides navigation related flight information data which can be displayed in the primary display region of display 140 according to a cockpit view display convention.

In FIG. 1, an altitude indicator 180 shows a scale which can provide the aircraft's altitude data on the display 140 of device 100. The embodiment shown in FIG. 1 illustrates such data as the aircraft's vertical assent and vertical velocity. The vertically oriented rectangular box on the right margin of the scale can provide data for example, on both a desired rate of ascent, or decent, and data on the actual rate of ascent or descent.

Heading indicator 190, in FIG. 1, illustrates an arc heading indication 190. As one of ordinary skill in the art will understand upon reading comprehending this disclosure, the arc is a partial compass rose which can present data for the aircraft's course and heading.

Figure 2:
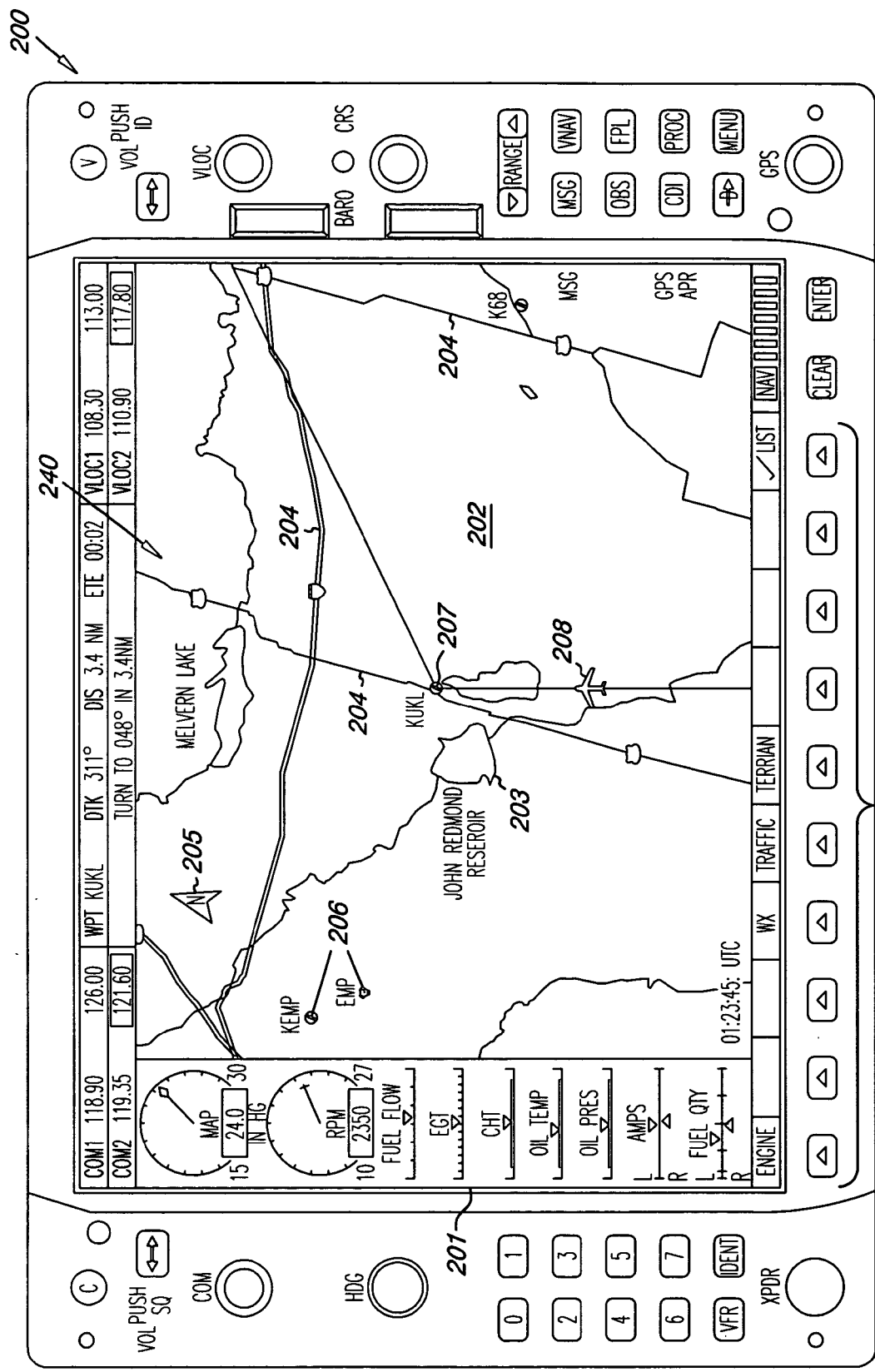
FIG. 2 illustrates another embodiment of an avionics device.

FIG. 2 provides an illustration of another device that can be utilized as or in a cockpit instrument panel. FIG. 2 illustrates one variably configurable complimentary multi-function display (MFD) device 200, which can be employed in conjunction with the device 100 described above in connection with FIG. 1. As shown in FIG. 2, the device 200 is a cockpit instrument panel 200.

Like the PFD device 100 shown in FIG. 1, the device 200 of FIG. 2 is a device capable of presenting text and graphical data/information, image, or video data. In some embodiments device 200 is adapted to include control of a number of audio capabilities. For example, in some embodiments, device 200 can be oriented side by side with the device 100 of FIG. 1 with an audio system situated between the two devices 100 and 200.

The device 200, shown in the embodiment of FIG. 2, illustrates the device 200 being utilized as navigational MFD. In some embodiments, the device 200 of FIG. 2 can be referred to as a NAV display 200.

In the embodiment shown in FIG. 2, the display 240 of device 200 illustrates engine data, shown at 201, and navigational data 202 presented from a viewpoint located above the actual aircraft. As one of ordinary skill in the art will further understand from reading and comprehending this disclosure, the navigational data presented from a viewpoint located above the actual aircraft is one of many viewpoint embodiments from which such navigational data can be displayed on device 200. The embodiments of the invention are not so limited. As described above in connection with FIG. 1, the display format of navigation related flight information data 202 presented on display 240 can be dynamically configurable.

The primary display region on display 240 and any display insets and/or graphical information overlays can be independently or collectively configurable to display navigation related, flight information data. In one embodiment, the primary display region on display 240 provides a two dimensional (2-D) perspective view. However, the embodiments of the invention are not so limited and a three dimensional (3-D) format is considered within the scope of the embodiments of the present invention.

In the embodiment shown in FIG. 2, the navigational data 202 portion of display 240 illustrates a number of geographical features such as a reservoir 203, a number of roadways 204, a north directional arrow marker 205, a number of aviation waypoints 206, a flight plan waypoint (KUKL) 207, and the aircraft's position relative to these features. However, as one of ordinary skill in the art will understand upon reading this disclosure, the embodiments of the invention are not limited to this particular number or choice of features. And, fewer or more features can be included within the scope of the embodiments of the present invention.

In FIG. 2, device 200 is illustrated providing complimentary flight information data to that discussed and illustrated above in connection with the device 100 of FIG. 1. That is, as shown in FIG. 2, engine data can be displayed within a column 201 on the display 240 of device 200. In the embodiment shown in FIG. 2, the engine data shown in column 201 can include additional data, such as aircraft equipment data, for example.

The column 201 can be used to display engine data representing engine power management, shown as exhaust gas temperature and cylinder heat temperature in order to regulate fine tuning of the engine power. The column 201 can also be used to display engine data representing fuel planning management. That is, the column 201 can include such engine data as fuel range, the current fuel burn rate, and or other so related parameters.

Devices, 100 and 200, can be used as complimentary devices and thereby can be used to provide wide graphical data displays integrated in one central location with the controls and devices themselves. In the embodiments shown in FIGS. 1 and 2, a perspective, cockpit flight view is principally illustrated on the display 140 of PFD 100 in FIG. 1 and a top down view is principally illustrated in on the display 240 of NAV display 200 in FIG. 2. In the embodiment of FIG. 1, the cockpit flight view on display 140 can include a presentation of flight information data indicators such as airspeed 160, attitude 170, altitude 180, and heading 190.

Figure 3:
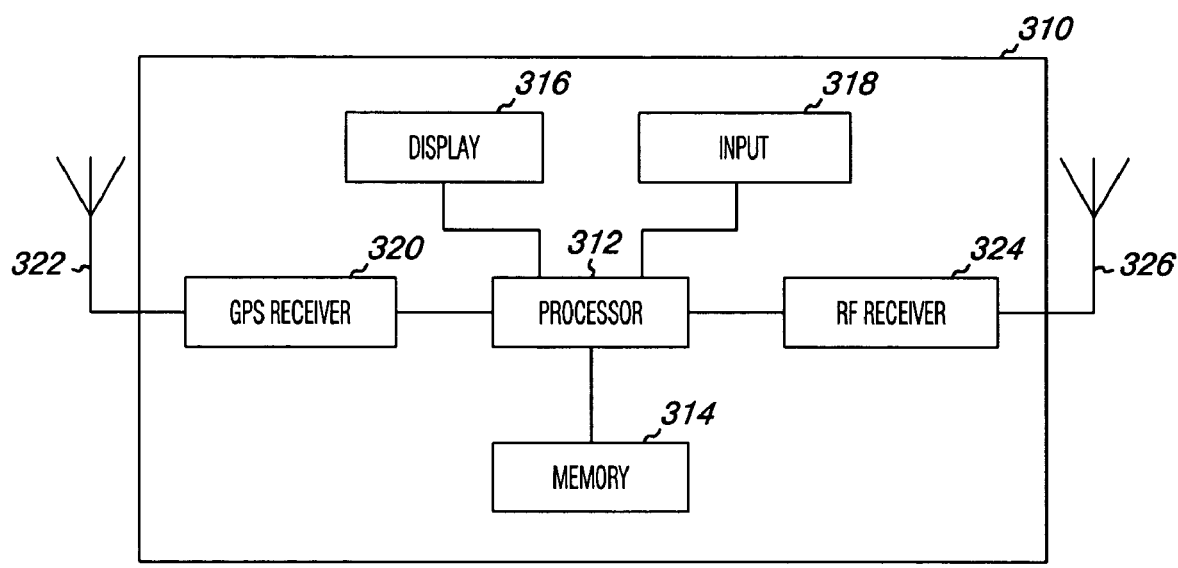
FIG. 3 illustrates the components of an embodiment of an avionics device.

FIG. 3 illustrates components of an embodiment of an avionics device, such as devices 100 and 200 of FIGS. 1 and 2. As shown in the embodiment of FIG. 3, an avionics device 310 can include a processor 312, a memory 314, a display 316, an input 318, a GPS receiver 320, a GPS antenna 322, a Radio Frequency (RF) receiver 324, and an RF antenna 326. These and other components can be utilized to run the operating system and software programming to provide the many functions of the devices described above with respect to FIGS. 1 and 2.

In the embodiment of FIG. 3, the processor 312 can be utilized process executable instructions that make up a software application or an operating system. The processor 312 can also be utilized to interpret data within a received signal. The signal can be interpreted to identify where the received information is to be stored, and/or can be utilized to indicate if the information is to be added to the information resident in the memory 314 on the device 310, or if the information is to replace information already stored in memory 314, for example.

The information received can, for example, be application software programs, operating system software programs, data for use in application or operating system software programs, and software program updates, among others. Examples of such information can include, but are not limited to global positioning system application software, navigational application information, navigational data, navaid data, and operating system information.

Embodiments can be performed by software, application modules, and computer executable instructions operable on the systems and devices shown herein or otherwise. The embodiments of the invention, however, are not limited to any particular operating environment or to software written in a particular programming language. Software, application modules and/or computer executable instructions, suitable for carrying out embodiments of the present invention, can be resident in one or more devices or locations or in several and even many locations.

Additionally, one of ordinary skill in the art will appreciate that one or more of the various components, can include a computer readable medium, on which a set of computer executable instructions can reside. Examples of memory and computer readable medium types include Non-Volatile (NV) memory (e.g. Flash memory), RAM, ROM, magnetic media, and optically read media and includes such physical formats as memory cards, memory sticks, memory keys, CDs, DVDs, hard disks, and floppy disks, to name a few.

In the embodiment of FIG. 3, the display 316 can be utilized to view information when receiving a signal. For example, the display can indicate that a signal is incoming. The device 310 can be designed to automatically accept signals or can be designed to allow a user to manually accept the receipt of a signal.

For example, the display could show a message indicating that a signal is being transmitted and can ask the user if the signal should be received. The user can respond, for example, via an input 318 such as a keypad or the like, that the signal should be received. Additionally, the device 310 can be designed such that a signal will not be received until a code or password is entered into the device 310. In such embodiments, the code or password can, for example, be entered via the input 318, such as a keypad. Any type of input 318 can be utilized, including but not limited to keypads, touch screens, voice recognition systems, and the like.

In the embodiment of FIG. 3, the GPS receiver 320 and GPS antenna 322 can act to receive GPS signals from a GPS system. The GPS receiver 320 and antenna 322 can be located together or apart from each other.

In the embodiment of FIG. 3, the RF receiver 324 and RF antenna 326 can act to receive RF signals from a radio frequency transmitter, such as land based transmitter 438 or satellite based transmitter 436 described in detail below with regard to FIG. 4. The RF receiver 320 and antenna 322 can be located together or apart from each other, the embodiments of the invention are not so limited. In various embodiments, the receiver can receive signals within the range of 500 to 1500 MHz and/or 2300 to 2400 MHz. These ranges have been licensed for use in transmitting satellite radio signals, also referred to as digital radio signals. Additionally or alternatively, in various embodiments the receiver can receive signals transmitted from Automatic Dependent Surveillance Broadcast (ADS-B) stations or may include a Universal Access Transceiver (UAT) and, in that regard, may be part of a transceiver for two-way data links.

Figure 4:
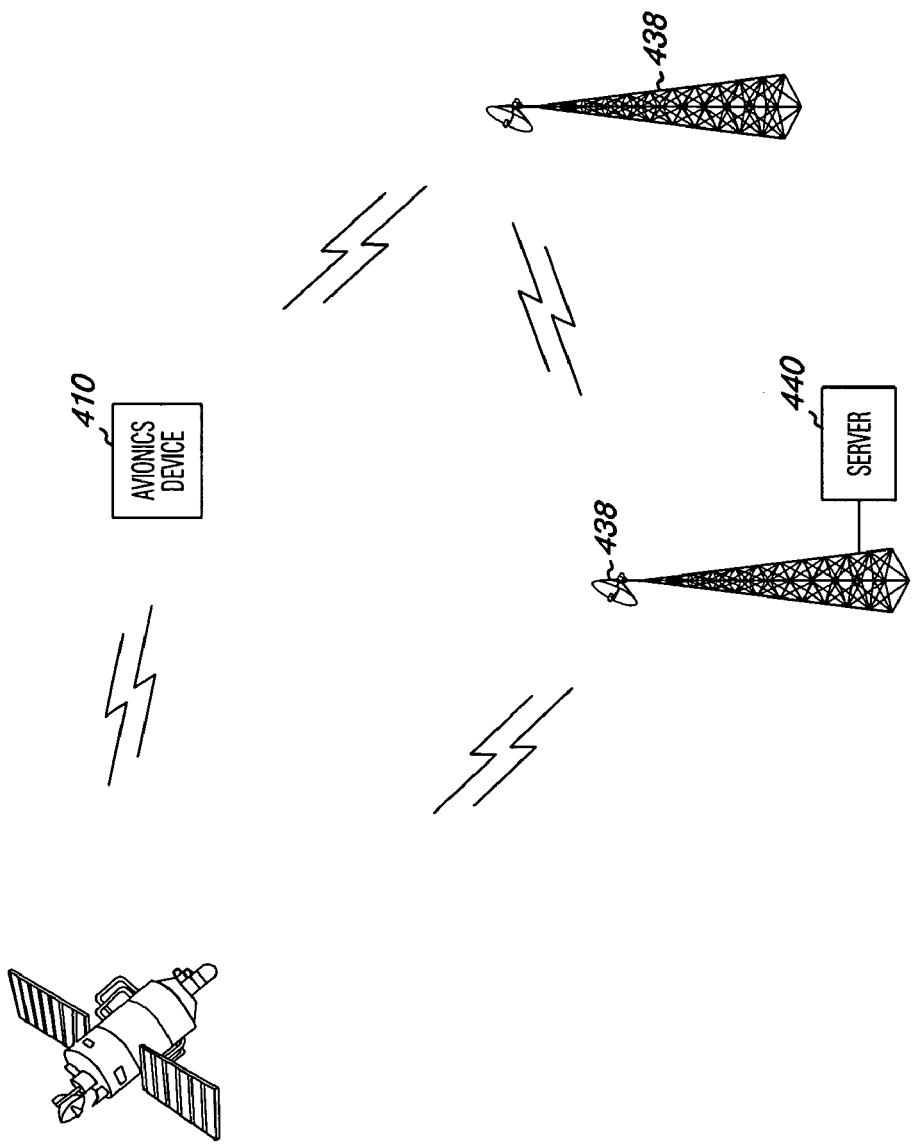
FIG. 4 illustrates a system embodiment.

FIG. 4 illustrates a system embodiment. In the embodiment of FIG. 4, the system includes an avionics device 410, a satellite 436, a number of land based transmitters 438, and a server 440. In the embodiment of FIG. 4, information, such as update information can be transmitted from the server 440 to the avionics device 410 along a number of paths, for example via satellite, via land based transmitters, or via a combination of satellite and land based transmitters.

For example, in various embodiments, an aviation navigation system can include a remote transmitter, a receiver, and an avionics device. For the purposes of describing the embodiments of the present invention, a remote transmitter can include transmitters resident on satellites, fixed land/ground based transmitters, and the like. The system can also include a relay for relaying a radio signal from a transmitter to a receiver. The relay can be provided on a satellite or on a land based structure and can be a transceiver for transmitting and receiving radio signals.

In the example shown in FIG. 4, a signal, having information therein, can be transmitted from the server 440 to a land based transmitter 438. The transmitter 438 can act as a relay and send the signal on to a satellite 436. The satellite 436 can transmit the signal directly to the avionics device 410 or can act as a relay to send the signal to a second satellite 436 or land based transmitter 438. The second satellite 436 or land based transmitter 438 can transmit the signal to the avionics device 410 or act as another relay.

In the example shown in FIG. 4, the signal, having the information therein, can also be transmitted from the server 440 to a first land based transmitter 438. The first transmitter 438 can send the signal directly to the avionics device 410 or can act as a relay to send the signal on to a second land based transmitter 438. The second land based transmitter 438 can transmit the signal to the avionics device 410.

Figure 5:
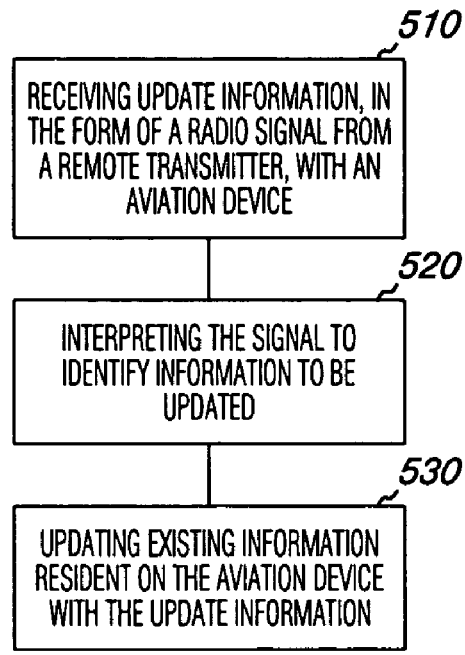
FIG. 5 illustrates a method embodiment for receiving data updates with an avionics device.
Figure 6:
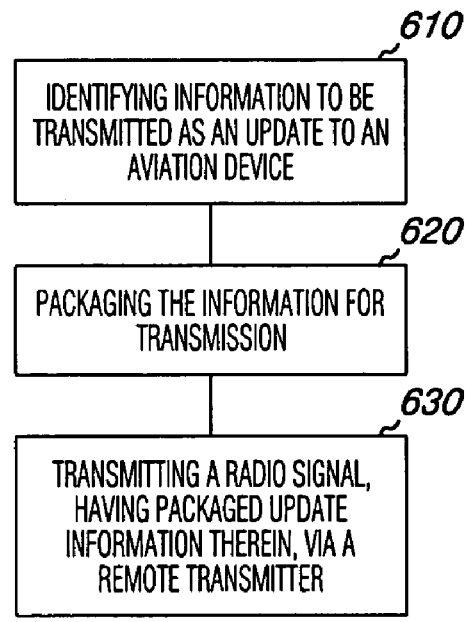
FIG. 6 illustrates a method embodiment for delivering data updates to an avionics device.
Figure 7:
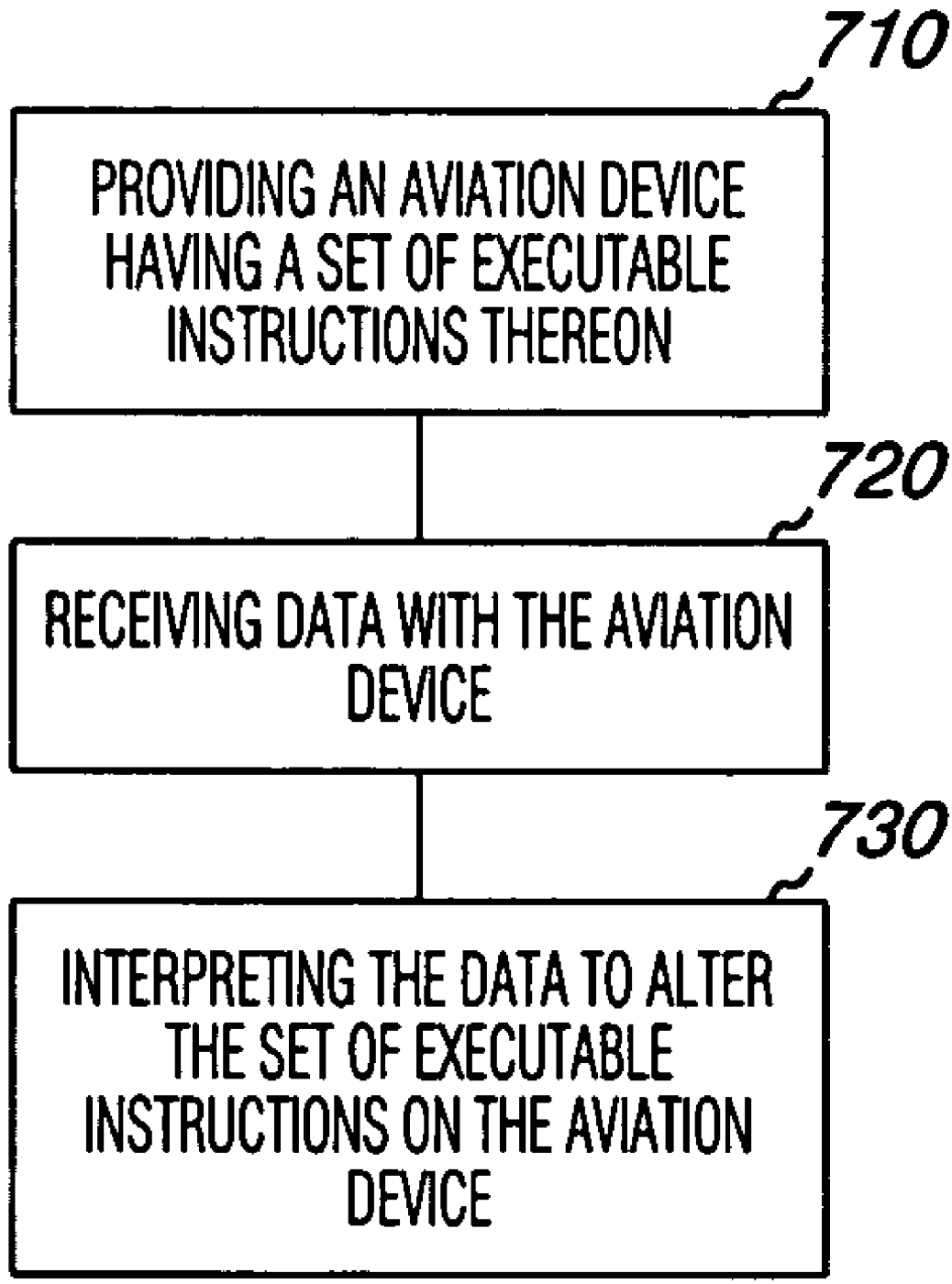
FIG. 7 illustrates a method embodiment for interpreting data to update executable instructions.

FIGS. 5-7 illustrate method embodiments for delivering updates to an avionics device or system. Unless explicitly stated, the method embodiments described herein are not constrained to a particular order or sequence. Additionally, some of the described method embodiments and elements thereof can occur or be performed at the same point in time.

FIG. 5 illustrates a method embodiment for receiving data updates with an avionics device. The method of FIG. 5 includes, receiving update information, in the form of a radio signal from a remote transmitter, with an avionics device at block 510. In various embodiments, receiving a radio signal can include receiving a radio signal transmitted from a satellite or a land based transmitter. Receiving update information can include receiving information updating geographic terrain map data. In some embodiments, receiving update information can include receiving information updating navaid map data. Receiving update information can include receiving information updating airport map data. Receiving update information can include receiving information updating avionics device operating system data. Receiving update information can include receiving information updating global positioning system data such as, for example, integrity information.

In block 520, the method includes interpreting the signal to identify information to be updated. The method of FIG. 5 also includes updating existing information resident on the avionics device with the update information at block 530.

FIG. 6 illustrates a method embodiment for delivering data updates to an avionics device. The method of FIG. 6 includes identifying information to be transmitted as an update to an avionics device at block 610. In block 620, the method also includes packaging the information for transmission.

The method of FIG. 6 also includes transmitting a radio signal via a remote transmitter having packaged update information therein to a number of avionics devices at block 630. Transmitting a radio signal having update information therein can include transmitting a radio signal at a private frequency restricted to devices authorized to access the frequency.

In various embodiments, the method can include providing an authorization code for accessing the radio signal. In some embodiments, providing an authorization code can include providing an authorization code to the device that allows the avionics device to receive the update information. Providing an authorization code can include providing an authorization code within the radio signal that allows the avionics device to receive the update information. Providing an authorization code can include providing an authorization code to the device that allows the remote transmitter to transmit the update information.

FIG. 7 illustrates a method embodiment for interpreting data to update executable instructions. The method of FIG. 7 includes providing an avionics device having executable instructions thereon at block 710.

In block 720, the method also includes receiving data, in the form of a radio signal from a remote transmitter, with the avionics device. In various embodiments, receiving data can include receiving software. Receiving software can include receiving application software. In some embodiments, receiving data includes receiving update information. Receiving data can include receiving data in the form of radio signals transmitted in radio frequencies in the range of 2300 and 2400 MHz. Receiving data can include receiving data in the form of radio signals transmitted in radio frequencies in the range of 500 and 1500 MHz. The method of FIG. 7 also includes interpreting the data to update the executable instructions on the avionics device at block 730.

Although specific embodiments have been illustrated and described herein, those of ordinary skill in the art will appreciate that any arrangement calculated to achieve the same techniques can be substituted for the specific embodiments shown.

This disclosure is intended to cover any and all adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes any other applications in which the above structures and methods can be used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An avionics device, comprising;
a processor;
a memory in communication with the processor;
a receiver to receive radio signals from a remote transmitter, wherein said radio signals include digital data representing update information, the update information including updates to software rather than just data, wherein the receiver is selected from the group consisting of an ADS-B receiver and a UAT datalink receiver; and
wherein the device can update information resident on the device based upon the update information received.

2. The device of claim 1, wherein the device can update global positioning system application software resident on the device.

3. The device of claim 2, wherein the device can update navigational data resident on the device.

4. The device of claim 3, wherein the device can update navaid data resident on the device.

5. The device of claim 1, wherein the device can update operating system information resident on the device.

6. The device of claim 1, wherein the receiver can receive radio frequencies in the range of 2300 and 2400 MHz.

7. The device of claim 1, wherein the receiver can receive radio frequencies in the range of 500 and 1500 MHz.

8. The device of claim 1, wherein the receiver includes an ADS-B receiver.

9. The device of claim 1, wherein the receiver includes a UAT datalink receiver.

10. An aviation navigation system, comprising;
a remote transmitter for transmitting, via a radio signal, digital data indicative of software;
a receiver to receive the radio signal, wherein the receiver is selected from the group consisting of an ADS-B receiver and a UAT datalink receiver; and
a relay means operable to relay the radio signal to the receiver; and
an avionics device in communication with the receiver and operable to store the software on the device.

11. The system of claim 10, wherein the relay means includes a transceiver positioned on the satellite.

12. The system of claim 10, wherein the relay means includes a transceiver positioned on a land based structure.

13. The system of claim 10, wherein the receiver includes a receiver that is located remotely from the avionics device.

14. The system of claim 10, wherein the software includes update navigational application information.

15. The system of claim 10, wherein the receiver includes an ADS-B receiver.

16. The system of claim 10, wherein the receiver includes a UAT datalink receiver.

17. A method for receiving data updates with an avionics device, comprising:
receiving update information in the form of digital data, via a radio signal from a remote transmitter to a receiver selected from the group consisting of an ADS-B receiver and a UAT datalink receiver, with an avionics device;
interpreting the signal to identify information to be updated; and
updating existing software resident on the avionics device with the update information.

18. The method of claim 17, wherein said receiving said radio signal from a remote transmitter includes receiving a radio signal transmitted from a satellite.

19. The method of claim 17, wherein said receiving said radio signal from a remote transmitter includes receiving a radio signal transmitted from a land based remote transmitter.

20. The method of claim 17, wherein said receiving update information includes receiving information updating geographic terrain map data.

21. The method of claim 17, wherein said receiving update information includes receiving information updating navaid map data.

22. The method of claim 17, wherein said receiving update information includes receiving information updating airport map data.

23. The method of claim 17, wherein said receiving update information includes receiving information updating avionics device operating system data.

24. The method of claim 17, wherein said receiving update information includes receiving information updating global positioning system data.

25. The method of claim 17, wherein said receiving update information includes receiving information with an ADS-B receiver.

26. The method of claim 17, wherein said receiving update information includes receiving information with a UAT datalink receiver.

27. A method for delivering data updates to an avionics device, comprising:
identifying information to be transmitted as an update to said avionics device;
packaging the information for transmission; and
transmitting a radio signal to a receiver selected from the group consisting of an ADS-B receiver and a UAT datalink receiver via a remote transmitter having packaged update information therein to a number of avionics devices, thereby updating software resident on the avionics devices.

28. The method of claim 27, wherein the method further includes providing an authorization code for accessing the radio signal.

29. The method of claim 28, wherein said providing said authorization code includes providing an authorization code to an avionics device that allows the avionics device to receive the update information.

30. The method of claim 29, wherein said providing said authorization code includes providing an authorization code within the radio signal that allows the avionics device to receive the update information.

31. The method of claim 28, wherein said providing said authorization code includes providing an authorization code to the device that allows the remote transmitter to transmit the update information.

32. The method of claim 27, wherein said transmitting said radio signal having update information therein includes transmitting a radio signal at a private frequency restricted to devices authorized to access the private frequency.

33. The method of claim 27, wherein the method further includes receiving the radio signal with an ADS-B receiver.

34. The method of claim 27, wherein the method further includes receiving the radio signal with a UAT datalink receiver.

35. A computer readable medium having a set of computer readable instructions, the set of computer readable instructions comprising instructions for:
receiving data, in the form of a radio signal from a remote transmitter to a receiver selected from the group consisting of an ADS-B receiver and a UAT datalink receiver, at an avionics device; and
interpreting the data to update the executable instructions on the avionics device.

36. The computer readable medium of claim 35, wherein said receiving data includes receiving software.

37. The computer readable medium of claim 36, wherein said receiving software includes receiving application software.

38. The computer readable medium of claim 35, wherein said receiving data includes receiving update information.

39. The computer readable medium of claim 35, wherein said receiving data includes receiving data in the form of radio signals transmitted in radio frequencies in the range of 2300 and 2400 MHz.

40. The computer readable medium of claim 35, wherein said receiving data includes receiving data in the form of radio signals transmitted in radio frequencies in the range of 500 and 1500 MHz.

41. The computer readable medium of claim 35, wherein said receiving data includes receiving data with an ADS-B receiver.

42. The computer readable medium of claim 35, wherein said receiving data includes receiving data with a UAT datalink receiver.

* * * * *